(12) United States Patent
McEwen

(10) Patent No.: US 6,357,690 B1
(45) Date of Patent: Mar. 19, 2002

(54) AXIALLY ADJUSTABLE COIL WINDING MANDREL

(75) Inventor: Matthew B. McEwen, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/475,344

(22) Filed: Dec. 30, 1999

(51) Int. Cl.[7] ................ B65H 54/56; B65H 75/14
(52) U.S. Cl. ................ 242/472.5; 242/118.5; 242/602.1
(58) Field of Search ............ 242/472.5, 118.5, 242/118.62, 118.7, 602.1, 607.2, 608.5, 609.3, 610.5

(56) References Cited

U.S. PATENT DOCUMENTS

| | | | |
|---|---|---|---|
| 242,188 A | * | 5/1881 | Cuff .................. 242/608.5 X |
| 940,826 A | * | 11/1909 | Roughan .............. 242/118.5 X |
| 1,942,113 A | * | 1/1934 | Meyers ................ 242/608.5 X |
| 2,789,775 A | * | 4/1957 | Thompson ............... 242/472.5 |
| 2,789,779 A | * | 4/1957 | Loop ................... 242/608.5 X |
| 4,852,964 A | | 8/1989 | Holland et al. |
| 5,022,602 A | * | 6/1991 | Lostracco ............. 242/118.5 X |
| 5,125,590 A | * | 6/1992 | LeCompte ............ 242/118.5 X |
| 5,131,538 A | | 7/1992 | Thibodeau |
| 5,546,482 A | * | 8/1996 | Cordova et al. ............... 385/12 |
| 5,551,647 A | * | 9/1996 | Browing .................. 242/118.5 |
| 5,841,932 A | | 11/1998 | Page et al. |

* cited by examiner

Primary Examiner—Michael R. Mansen
(74) Attorney, Agent, or Firm—Shahpar Shahpar; Robert E. Greenstien

(57) ABSTRACT

A coil winding mandrel comprises a mandrel core and two end flanges, a stationary flange and an adjustable flange. A spring provides a predetermined force between the end flanges.

7 Claims, 4 Drawing Sheets

AXIALLY ADJUSTABLE COIL WINDING MANDREL

BACKGROUND OF THE INVENTION

1. Technical Field

The present invention generally relates to a mandrel for winding a coil and methods for its use. More particularly, the present invention relates to an axially adjustable mandrel for winding a coil and methods for its use.

2. Background Art and Technical Problems

Precision wound coils are used in various applications, such as in fiber optic gyroscopes. Coils for such applications must be wound in a precise and symmetric manner. Any non-symmetry will introduce errors into the gyroscope. A mandrel is used to precisely wind such coils. A mandrel is a form upon which a coil can be wound and subsequently processed. The coil may include a fiber optic coil, an electrical coil, or the like. For purposes of illustration only, without limitation, the coil will hereinafter be described as a fiber optic coil. The processing may include varying the temperature of the coil, subjecting the coil to chemical treatment, or the like, A coil material such as a fiber optic coil is wound on the mandrel in a precise manner to optimize coil symmetry. During the winding process, the mandrel serves to aid in the precise alignment of the coil. An adhesive material may be applied to the fiber prior to or during the winding process. After the winding process is completed, the coil is heated, cooled, and/or left at room temperature to cure the adhesive. During the subsequent curing, the mandrel serves to maintain the alignment of the coil. Following the curing process, the coil is removed from the mandrel to leave a stand-alone coil.

In the past, mandrels have consisted of a core about which the coil is wound and two fixed flanges at the ends of the core to define the edges of the coil. The winding of the first layer of the coil is critical because the first layer becomes the form and pattern which determines the spacing and positioning of subsequent layers. Ideally, the axial spacing between the end flanges is selected to aid in the alignment of the first layer. If the axial spacing is too large or too small, for example, because of variation in the fiber diameter of the coil material, the coil winds will not be tightly spaced and the necessary precision of the first layer cannot be achieved. To overcome this problem, some mandrels have used a grooved core to correctly position the first layer of the wound coil. However, a different grooved core must be used for each coil having a different fiber diameter which is impractical and costly. In addition, fiber diameters have tolerances which may change when the coil is processed. Consequently, a grooved core having a predetermined number of turns per layer cannot accommodate such changes in fiber diameter tolerances.

Other prior art mandrels have a smooth surface on the mandrel. Winding a coil onto a smooth surfaced mandrel is difficult because there are no grooves to guide each turn of the coil onto the mandrel surface. The prior art mandrels, both grooved and smooth surfaced, have used fixed flanges with a predetermined coil height where the coil height is the axial distance between the two flanges. The coil height of fixed flange mandrels cannot be adjusted during winding or curing. The fixed coil height may cause one or both of the fixed flanges to misshape or crush the coil during curing. Such a problem depends on the amount of expansion and/or shrinkage of the coil during curing. The mandrels of the prior art having fixed flanges do not allow for expansion and/or contraction of the coil material during a curing process. Accordingly, expansion of the coil material against the fixed flanges may cause unacceptable distortion in a precision coil, and contraction may misalign the tightly spaced layers of coil.

In addition, the effect of a temperature change on a grooved mandrel during curing is even more dramatic. During such a curing process, a coil that is wound into the grooves may expand at a different rate than the mandrel material. This differential expansion between the coil and the grooved mandrel causes a ripping effect of the base layer of the coil. In essence, this affects the final symmetry of the coil and can cause permanent stress points in the coil which are highly undesirable.

Due to the need for precision wound coils and in view of the problems associated with prior art mandrels and methods, a need exists for a mandrel having an adjustable flange that can move axially during coil winding and/or processing.

SUMMARY OF THE INVENTION

In accordance with one embodiment of the invention, a mandrel is provided that aids in the precise winding of the first and subsequent layers of a coil. The mandrel also adjusts to accommodate the thermal expansion and/or contraction properties of the coil material during a curing operation. In accordance with one embodiment of the invention, a mandrel includes a smooth core combined with one stationary flange and one adjustable flange. The first coil layer is wound onto the core starting at the stationary flange end. The adjustable flange is then brought into close contact with the last winding at the opposite end of the first layer of the coil and is fixed in this position. Subsequent layers of the coil are wound over the first layer, using the two flanges as edge guides. When the coil winding is completed, a spring mechanism is used to hold the adjustable flange against the edge of the wound coil with a predetermined force such that the mandrel is axially loaded and the coil height may vary during a subsequent curing process. During the curing process, the temperature of the coil and the adhesive associated with the coil may be varied. The predetermined force is selected to allow a controlled axial movement of the adjustable flange as the coil material undergoes changes as a result of the temperature change. The controlled movement accommodates expansion and/or shrinkage of the coil material, but maintains the windings in proper alignment and position.

BRIEF DESCRIPTION OF THE DRAWING FIGURES

The subject invention will hereinafter be described in the context of the appended drawing figures, wherein like numerals denote like elements, and:

DETAILED DESCRIPTION

Figure 1:
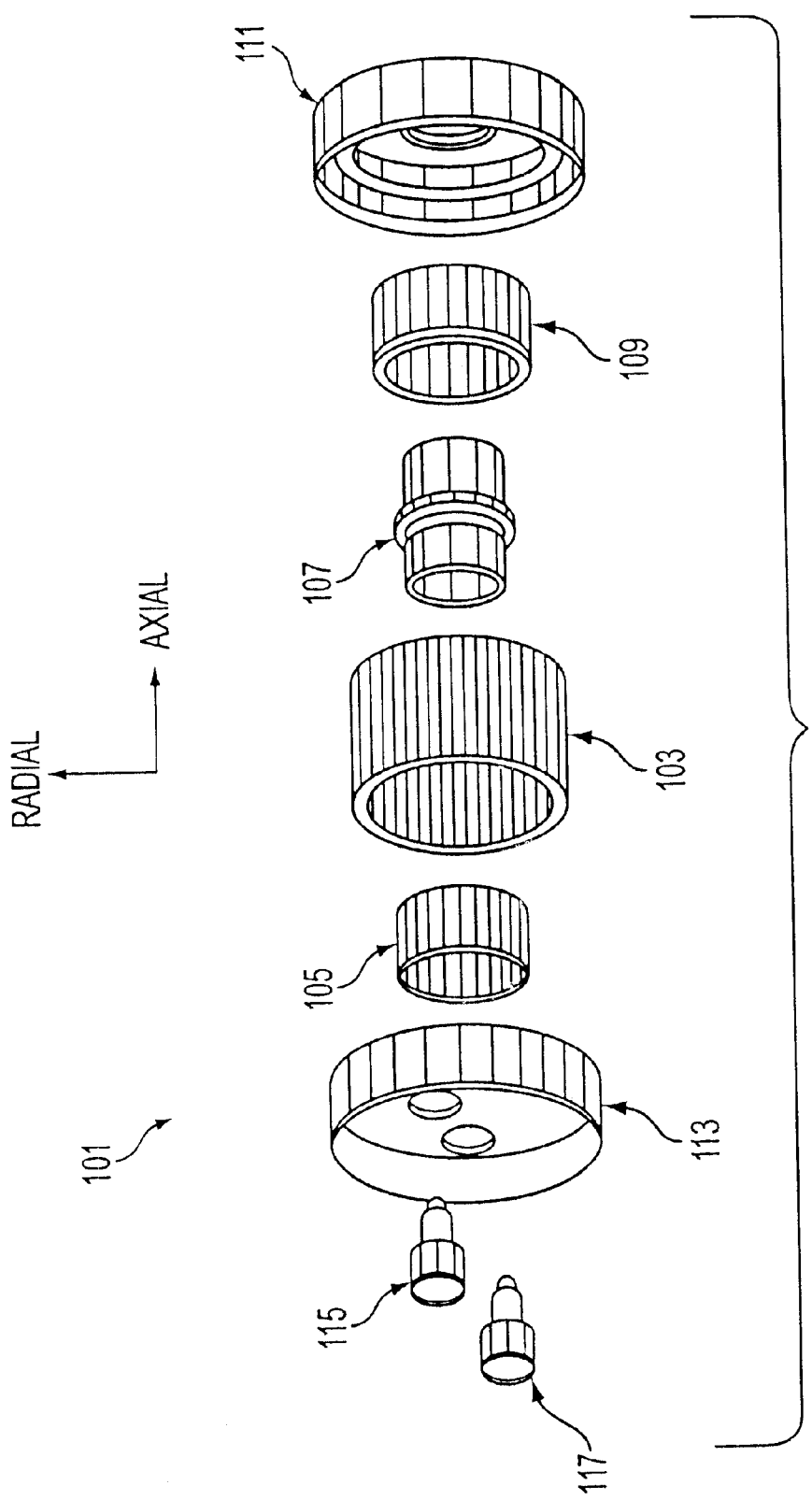
FIG. 1 illustrates, in exploded perspective view, an adjustable mandrel in accordance with an embodiment of the present invention.

FIG. 1 illustrates, in exploded perspective view, an adjustable mandrel 101 in accordance with one embodiment of the present invention. Adjustable mandrel 101 includes a mandrel core 103 coupled to two end flanges, an adjustable flange 113 and a stationary flange 111. Mandrel core 103 may be used to wind a coil onto its surface. Adjustable flange 113 is coupled to mandrel core 103 using a first threaded cylinder 105 and a threaded insert 107. Stationary flange 111 is also coupled to mandrel core 103 using a second threaded cylinder 109 and threaded insert 107. Mandrel core 103 is coupled to first threaded cylinder 105 and second threaded cylinder 109 by threaded insert 107. Stationary flange 111 is coupled to mandrel core 103 such that stationary flange 111 is fixed to mandrel core 103 to provide static support. In contrast, adjustable flange 113 is coupled to mandrel core 103 such that adjustable flange 113 is axially moveable relative to stationary flange 111. The anal and radial directions are shown in FIG. 1, where the axial direction runs parallel to the axis of adjustable mandrel 101. To aid in coupling adjustable flange 113 to mandrel core 103, a first retractable plunger 115 and a second retractable plunger 117 are used. First and second retractable plungers 115 and 117 may be used to attach adjustable flange 113 to mandrel core 103 in order to aid in further assembly of adjustable mandrel 101, as discussed below.

Figure 2:
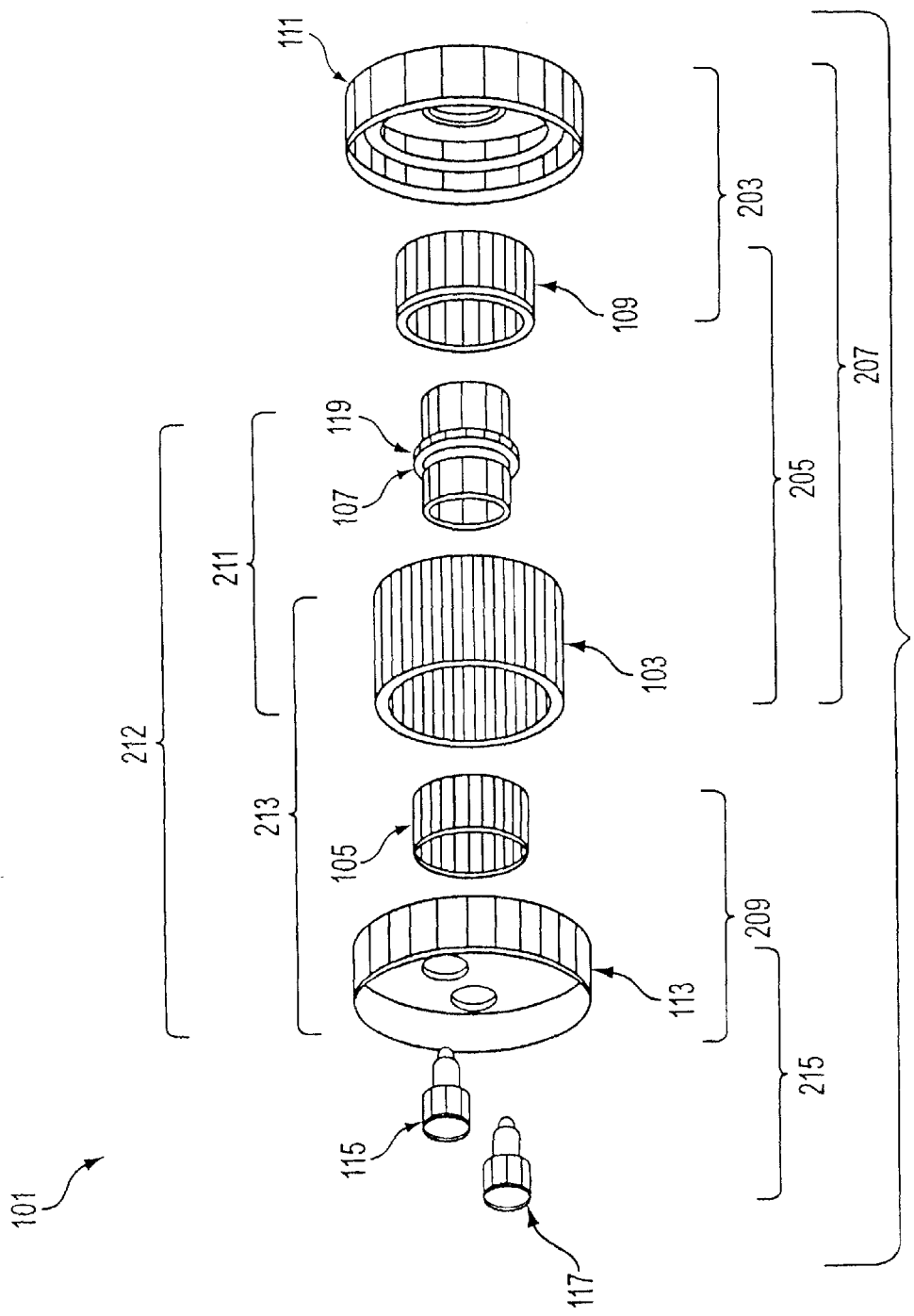
FIG. 2 illustrates one method of assembling the adjustable mandrel of FIG. 1.

FIG. 2 illustrates one method of assembling adjustable mandrel 101 of FIG. 1. In step 203, second threaded cylinder 109 is securely attached to stationary flange 111. In step 205, second threaded cylinder 109 is inserted into mandrel core 103 until it bottoms out, where "bottoms out" means being inserted into mandrel core 103 to the maximum extent possible. At this point, stationary flange 111 is coupled to mandrel core 103 in step 207. In step 209, first threaded cylinder 105 is securely attached to adjustable flange 113. By way of illustration, the relative secure attachments in steps 203 and 209 may be accomplished using screws, hooks, plungers, magnets, adhesives, or the like. Furthermore, in a preferred embodiment of the present invention, these relative secure attachments and/or connections may be configured to fixedly attach the components, such as using three screws.

In step 211, threaded insert 107 is inserted into mandrel core 103 and threaded insert 107 is threaded into second threaded cylinder 109 until threaded insert 107 bottoms out. In addition, in step 212, threaded insert 107 is threaded into first threaded cylinder 105 until threaded insert 107 bottoms out.

Figure 3:
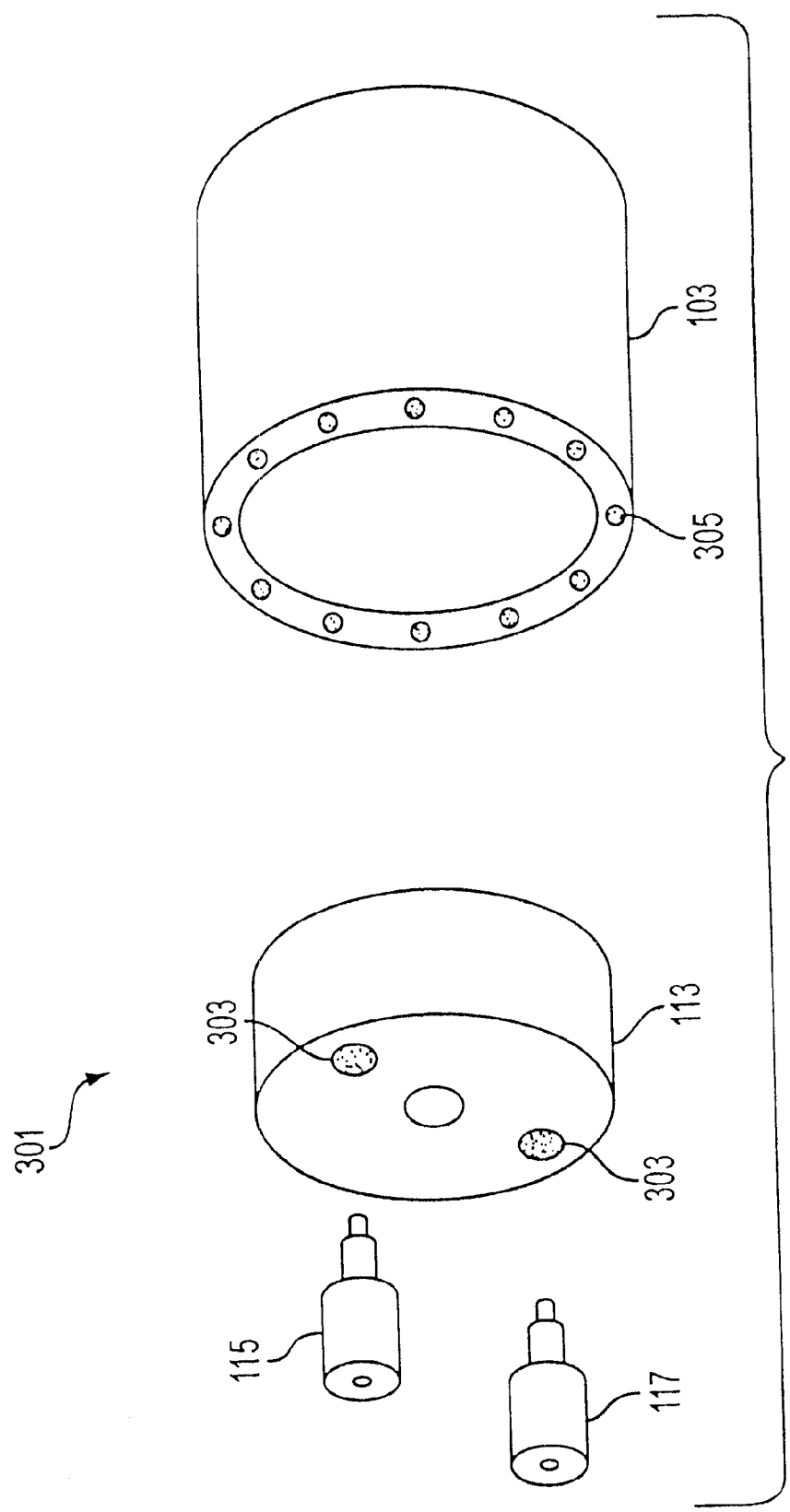
FIG. 3 is an exploded perspective showing retractable plungers that are inserted into an adjustable flange on a mandrel according to the present invention.

In step 213, adjustable flange 113 is attached to mandrel core 103 using first and second retractable plungers 115 and 117. First and second retractable plungers 115 and 117 may include a threaded piece with a spring-loaded plunger that retracts and pushes out. Indeed, first and second retractable plungers 115 and 117 may include any rotation alignment fixturing. For example, first and second threaded plungers can be McMaster-Carr™ hand retractable plungers (84935A33) or dowel pins. First and second retractable plungers 115 and 117 may be used to locate a position for coupling adjustable flange 113 to mandrel core 103. First and second retractable plungers 115 and 117 may be inserted into adjustable flange 113 through one or more flange holes 303 (as shown in FIG. 3) and into mandrel core 103 through one or more mandrel holes 305 (as shown in FIG. 3). FIG. 3 illustrates first and second retractable plungers 115 and 117, adjustable flange 113, and mandrel core 103 of FIGS. 1 and 2, in addition to an adjustable flange assembly 301, flange holes 303, and mandrel holes 305. Mandrel core 103 may include one or more mandrel holes 305 to receive first and/or second retractable plungers 115 and 117. In a preferred embodiment of the present invention, there are twelve mandrel holes 305 and two retractable plungers. Those skilled in the art will appreciate that the number of holes and/or the number of rotation alignment elements may be chosen based on the amount of precise adjustment needed when coupling adjustable flange 113 to mandrel core 103. Accordingly, the more holes provided, then the more precision adjustment adjustable flange 113 is capable of for coupling to mandrel core 103.

To aid in adjustment of adjustable flange 113 to mandrel core 103, first and second retractable plungers 115 and 117 may be locked in place by releasing the plungers and radially rotating adjustable flange 113 until at least one of the plungers locks into at least one of mandrel holes 305 (step 215). Once first and second retractable plungers 115 and 117 are locked, adjustable flange 113 is attached to mandrel core 103. For substantially precise alignment of adjustable flange 113 with mandrel core 103, threaded insert 107 may be rotated with a ball lock pin to axially adjust adjustable flange 113 relative to stationary flange 111.

The inserting and/or threading in steps 211 and 212, in accordance with a preferred embodiment, will be better understood by considering the manner in which each of the components is configured and attached, as follows. The configuring and attaching is done in order to allow the axial spacing between adjustable flange 113 and stationary flange 111 to be adjusted (i.e., widened and/or narrowed). The threads on the first side of the outer surface of threaded insert 107 are coupled to the threads on the inner surface of first threaded cylinder 105, and the threads on the second side of the outer surface of threaded insert 107 are coupled to the threads on the inner surface of second threaded cylinder 109. Thus, in this embodiment, the threads on the first side of threaded insert 107 must match the threads of first threaded cylinder 105 and the threads on the second side of threaded insert 107 must match the threads of second threaded cylinder 109.

In addition, the threads on threaded insert 107 can be both right hand threads (or both left hand threads) such that when one side is turned in the tightening direction, the other side will turn in the loosening direction. Regardless of the direction of the threads, tightening turns will move first and/or second threaded cylinders 105 and 109 along threaded insert 107 in the axial direction to a middle flange 119 (also pointed to by the labeling arrow of threaded insert 107) until each threaded cylinder bottoms out and loosening turns will move first and second threaded cylinders 105 and 109 away from middle flange 119.

Furthermore, the threads on first threaded cylinder 105 and second threaded cylinder 109 may have equal or unequal pitch. To provide fine adjustment for the axial spacing between adjustable flange 113 and stationary flange 111, the pitch of the threads on first threaded cylinder 105 may be greater than the pitch of the threads on second threaded cylinder 109, or vice-versa. Accordingly, the threads on the first and second sides of threaded insert 107 may match the threads on first and second threaded cylinders 105 and 109, respectively. The threads on first threaded cylinder 105, second threaded cylinder 109, and threaded insert 107 may range from about 1 to about 100 threads per inch. Those skilled in the art will appreciate that other ranges of pitch can be used depending on the accuracy of adjustment needed for the specific fiber diameter of coil that will be wound onto mandrel core 103. In a preferred embodiment, first threaded cylinder 105 and the first side of threaded insert 107 have a pitch of about 48 (forty-eight), and second threaded cylinder 109 and the second side of threaded insert 107 have a pitch of about 44 (forty-four) which is for a coil having a fiber diameter of about 0.005 of an inch. In this preferred embodiment of the present invention, if both the first and second threaded cylinders 105 and 109 have right hand threads, then rotation in one direction would cause a difference in pitch in the axial direction. In such an embodiment, the axial resolution would result in a difference in pitch of about 0.002 inches per revolution of threaded insert 107. Threaded insert 107 may be threaded into first and second threaded cylinders 105 and 109 using a tool that locks onto threaded insert 107 and is capable of rotating threaded insert 107, such as a ball lock pin. First threaded cylinder 105, second threaded cylinder 109, and threaded insert 107 may be adjusted to accommodate different coil heights.

Following step 215, a coil may be wound around mandrel core 103. To wind the first layer of coil onto mandrel core 103 in a symmetrical fashion, adjustable flange 113 may be adjusted to expand and/or shrink the spacing between adjustable flange 113 and stationary flange 111 where the coil can be wound. For example, the last turn of the first layer of the coil may require adjustable flange 113 to move axially to lay down a symmetrical first layer of coil. In a preferred embodiment, the spacing between adjustable flange 113 and stationary flange 111 and thus the coil height may be adjusted by turning threaded insert 107 in the tightening or loosening direction. For example, first threaded cylinder 105 may be adjusted onto threaded insert 107 by turning threaded insert 107. Thus, FIG. 2 illustrates one-way of assembling adjustable mandrel 101, however, those skilled in the art will appreciate that assembly may be achieved using various methods.

In a preferred embodiment of such an assembly of adjustable mandrel 101, mandrel core 103 may have a smooth or grooved surface to wind the coil and a radial coefficient of thermal expansion in the range of about 0 (zero) to about 20 (twenty) micro-inches per inch degree Fahrenheit. Mandrel core 103 can be comprised of stainless steel, titanium, iron alloy (e.g., invar), and/or nickel alloy (e.g., monel), or the like. In addition, the surface of mandrel core 103 may be coated with at least one high abrasion resistance material having a high release (i.e., low friction) property, such as Marlite™, (FRP) Fiberglass Reinforced Polyester, Teflon™, PFA (Perfluoroalkoxy), PTFE (Polytetrafluoroethylene), FEP (Fluorinated Ethylene Propylene copolymer), and/or ETFE (copolymer of Ethylene and Tetrafluoroethylene), or the like. Those skilled in the art will appreciate that various other materials may be used in place of the above-mentioned for mandrel core 103 and a coating for mandrel core 103 when keeping in mind that the radial coefficient of thermal expansion of mandrel core 103 and the coil should be approximately equals and such a coating for mandrel core 103 should have a high abrasion resistance and high release property. In a preferred embodiment of the present invention, a smooth surfaced stainless steel mandrel core 103 is coated with PFA.

In addition, in order for the various elements of adjustable mandrel 101 to expand or contract at approximately the same rate and approximately the same radial distance, the radial coefficients of thermal expansion of the various elements of adjustable mandrel 101 and the coil should be approximately equal. In a preferred embodiment of the present invention, each of the components of adjustable mandrel 101 are comprised of stainless steel such that they have equal radial coefficients of thermal expansion of about 9.5 to 10 micro-inches per inch degree Fahrenheit.

Figure 4:
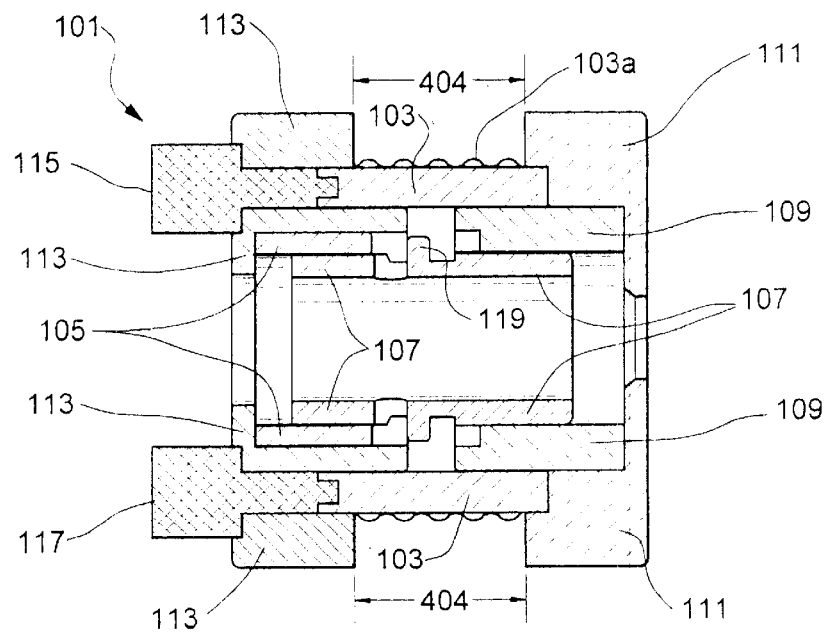
FIG. 4 illustrates a cross-section of an assembled adjustable mandrel in accordance with an embodiment of the present invention.

FIG. 4 illustrates, in cross-section, adjustable mandrel 101 assembled in the manner described above. The cross-section of adjustable mandrel 101 illustrates one assembly of the adjustable mandrel of the present invention. The adjustable mandrel 101 includes mandrel core 103 coupled to the adjustable flange 113 through first threaded cylinder 105, threaded insert 107, and first and second retractable plungers 115 and 117. The adjustable mandrel 101 also includes mandrel core 103 coupled to stationary flange 111 through second threaded cylinder 109 and threaded insert 107. As mentioned previously, the surface of mandrel 101 may be grooved 103a, as shown in FIG. 4, or smooth 103b, as shown in FIG. 5.

Adjustable mandrel 101 is illustrated with adjustable flange 113 and stationary flange 111 adjusted to approximately the midpoint of their adjustable width. FIG. 4 illustrates only one position of adjustable mandrel 101. The axial distance between adjustable flange 113 and stationary flange 111 (represented by width 404) may be widened or narrowed by rotating threaded insert 107 to accommodate a coil during processing, such as winding the coil onto adjustable mandrel 101, for example.

This assembly embodiment also depicts the insertion of first and second retractable plungers 115 and 117 into mandrel core 103 in order to couple mandrel core 103 and adjustable flange 113. Once adjustable mandrel 101 is assembled, a coil may be wound around mandrel core 103 to lay a first layer and subsequent layers of coil onto the surface of mandrel core 103. At this point, width 404 may be widened or narrowed by rotating threaded insert 107 onto first and/or second threaded cylinders 105 and 109, respectively, to accommodate a particular coil height and/or lay a first symmetric layer and subsequent symmetric layers of coil onto mandrel core 103. After winding the coil, the coil may be cured to secure the adhesive on the coil material. To accommodate changes in coil height, in accordance with an embodiment of the invention, adjustable flange 113 is held against the edge of the coil by a predetermined force. In accordance with a preferred embodiment, the predetermined force is applied by a spring as illustrated in cross-section in FIG. 5.

Figure 5:
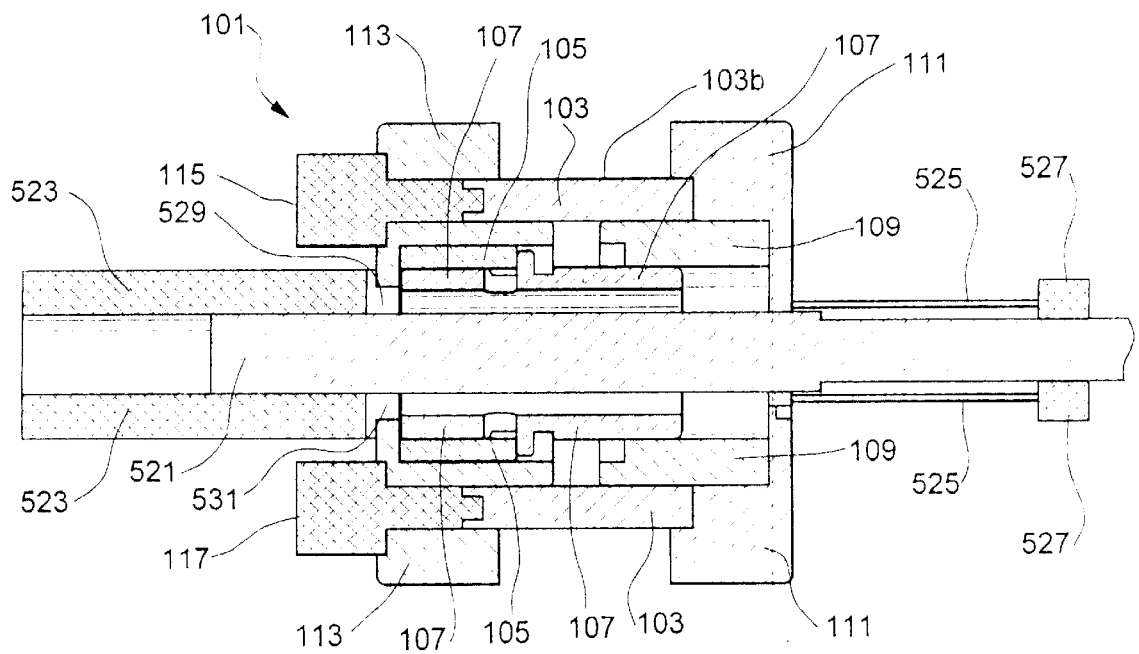
FIG. 5 illustrates a cross-section of an assembled adjustable mandrel in accordance with an embodiment of the present invention having a spring system.

In FIG. 5, a cross-section of an embodiment of the present invention is illustrated by adjustable mandrel 101 having a rod 521, a first collar 523, a first plug 529, a second plug 531, a spring 525, and a second collar 527. The cross-section of adjustable mandrel 101 illustrates one assembly of the adjustable mandrel of the present invention. In order to prepare adjustable mandrel 101 for processing, any screws attaching first threaded cylinder 105 to adjustable flange 113 may be de-coupled.

First collar 523 is coupled to rod 521 in order to provide support at the first side of adjustable mandrel 101 for assembling and using spring 525. First and second plugs 529 and 531 may be used to make the entrance diameter of rod 521 on the first side of adjustable mandrel 101 approximately equal to the exit diameter of rod 521 at the second side of adjustable mandrel 101. Spring 525 is coupled to rod 521 at the second side of adjustable mandrel 101. Second collar 527 is also coupled to rod 521 at the second side of adjustable mandrel 101 such that adjustable mandrel 101 is axially loaded. Spring 525 and second collar 527 coupled to rod 521 allow for axial movement if the coil wound around mandrel core 103 expands and/or shrinks. Accordingly, since adjustable mandrel 101 is axially loaded, a controlled axial movement can be achieved. In essence, spring 525 coupled between adjustable flange 113 and stationary flange 111 provides controlled axial movement of adjustable flange 113 and creates a predetermined force between adjustable flange 113 and stationary flange 111.

Adjustable flange 113 is capable of being fixed in a predetermined axial position with respect to stationary flange 111 during winding of the coil about mandrel core 103 and subsequently capable of being moveably positioned against the coil by a predetermined force during curing of the coil. Indeed, the predetermined force is not limited to the spring system described above. The predetermined force may be created by various methods and elements such that a controlled movement of adjustable flange 113 is possible. Such a controlled axial movement depends on the magnitude of the predetermined force which may be selected based on the degree of control that is desired during expansion and/or shrinkage of the coil. The material of spring 525 may be chosen depending on the predetermined force that is desired between adjustable flange 113 and stationary flange 111. In addition, the predetermined force caused by spring 525 may also be varied depending on the spring constant and the amount of compression of spring 525.

Once adjustable mandrel 101 is capable of accommodating a controlled axial movement of the coil, processing of the coil may be performed. For example, adjustable mandrel 101 may be processed by heating, cooling, and/or being left at room temperature. The heating process may include, for example, placing adjustable mandrel 101 into an oven and varying the temperature for a specified amount of time. During such a heating process, the coil may expand and adjustable mandrel 101 of the present invention will accommodate such expansion. Following the heating process, adjustable mandrel 101 may be cooled in a cooling oven where the coil may contract and adjustable mandrel 101 will also accommodate such shrinkage. When the coil is cured and ready for removal, adjustable mandrel 101 may be disassembled in reverse order from the steps illustrated in FIG. 2, for example. Finally, the coil may be removed from mandrel core 103 with substantially no misshaping or crushing. In addition, the high abrasion resistance and low friction coating on the surface of mandrel core 103 allows for easy removal or release of the coil from the surface of mandrel core 103.

In a preferred embodiment of the present invention, the radial coefficients of thermal expansion of mandrel core 103, first threaded cylinder 105, threaded insert 107, second threaded cylinder 109, stationary flange 111, adjustable flange 113, first retractable plunger 115, second retractable plunger 117, rod 521, first collar 523, first plug 529, second plug 531, and second collar 527 may be equal. However, those skilled in the art will appreciate that the radial coefficients of thermal expansion of the various elements may be approximately equal in such a way as to expand and/or contract radially at approximately the same rate and approximately the same amount as the coil. In addition, in a preferred embodiment, second collar 527 may be a set screw collar, for example.

The mandrel of the present invention allows for axial movement of the adjustable flange to accommodate coil expansion and/or contraction during processing. Allowing such axial movement substantially reduces misshaping and crushing of the coil during such processing steps. In addition, the flexible adjustability of the present invention permits a symmetrical first layer of coil to be wound onto the mandrel core to substantially reduce misshaping and crushing of the coil.

Although the invention has been described herein with reference to the appended drawing figures, it will be appreciated that the scope of the invention is not so limited. Various modifications in the design and implementation of various components and method steps discussed herein may be made without departing from the spirit and scope of the invention, as set forth in the appended claims.

What is claimed is:

1. An apparatus for winding a coil, comprising:
a mandrel core around which the coil can be wound;
a stationary flange coupled to the mandrel core; and an adjustable flange coupled to the mandrel core and spaced apart from the stationary flange and configured such that the adjustable flange can move axially,
wherein the adjustable flange is coupled to the first side of the mandrel core with a first threaded cylinder threaded into a first side of a threaded insert and the stationary flange is coupled to the second side of the mandrel core with a second threaded cylinder threaded into a second side of the threaded insert.

2. The apparatus of claim 1 wherein the pitch of the first threaded cylinder and the second threaded cylinder are different.

3. The apparatus of claim 1 wherein:
the radial coefficients of thermal expansion of the coil, the mandrel core, the adjustable flange, the stationary flange, the first threaded cylinder, the second threaded cylinder, and the threaded insert are approximately equal.

4. The apparatus of claim 1 further comprising at least one retractable plunger coupled to the adjustable flange and the first side of the mandrel core to prevent the adjustable flange from moving radially about the adjustable flange's axis.

5. The apparatus of claim 1 further comprising:
a spring coupled between the adjustable flange and the stationary flange to provide controlled moved of the flange.

6. The apparatus of claim 1 wherein the mandrel has a smooth surface.

7. The apparatus of claim 1 wherein the mandrel core has a grooved surface.

* * * * *